United States Patent [19]
Stark et al.

[11] Patent Number: 5,225,884
[45] Date of Patent: Jul. 6, 1993

[54] EXCIMER LASER PULSE ANALYZER AND METHOD

[75] Inventors: Steven A. Stark, Cupertino; David Shen, Los Altos, both of Calif.

[73] Assignee: Optical Associates, Inc., Milpitas, Calif.

[21] Appl. No.: 716,667

[22] Filed: Jun. 5, 1991

[51] Int. Cl.$^5$ ................................................ G01J 1/44
[52] U.S. Cl. .................................. 356/73; 250/214 P; 356/226
[58] Field of Search ........ 250/214 A, 214 B, 214 AG, 250/214 P; 356/226, 215, 73

[56] References Cited

U.S. PATENT DOCUMENTS 4,061,925  12/1977  van der Gaag et al. ......... 250/214 B
4,637,721  1/1987   Naruse et al. .......................... 356/215
5,012,202  4/1991   Taylor ............................. 250/214 A Primary Examiner—Vincent P. McGraw
Assistant Examiner—K. P. Hantis
Attorney, Agent, or Firm—Flehr, Hohbach, Test, Albritton & Herbert

[57] ABSTRACT

System and method for analyzing pulses from an excimer laser by measuring light energy rather than heat energy. The output of the laser is monitored with a photodetector to provide electrical current pulses corresponding to the intensity of the light in individual ones of the laser pulses. The current pulses are integrated to provide voltages corresponding to the light energy of the laser pulses, and the voltages are converted to digital signals. The digital signals are accumulated during the exposure period to determine the total light energy of the pulses during that period and also during a shorter interval of time during the exposure period. The light energy for the interval is divided by the length of the interval to determine the average intensity of the pulses during the interval. Displays are provided for the light energy and the intensity of the pulses, as well as the length of the exposure period.

14 Claims, 5 Drawing Sheets

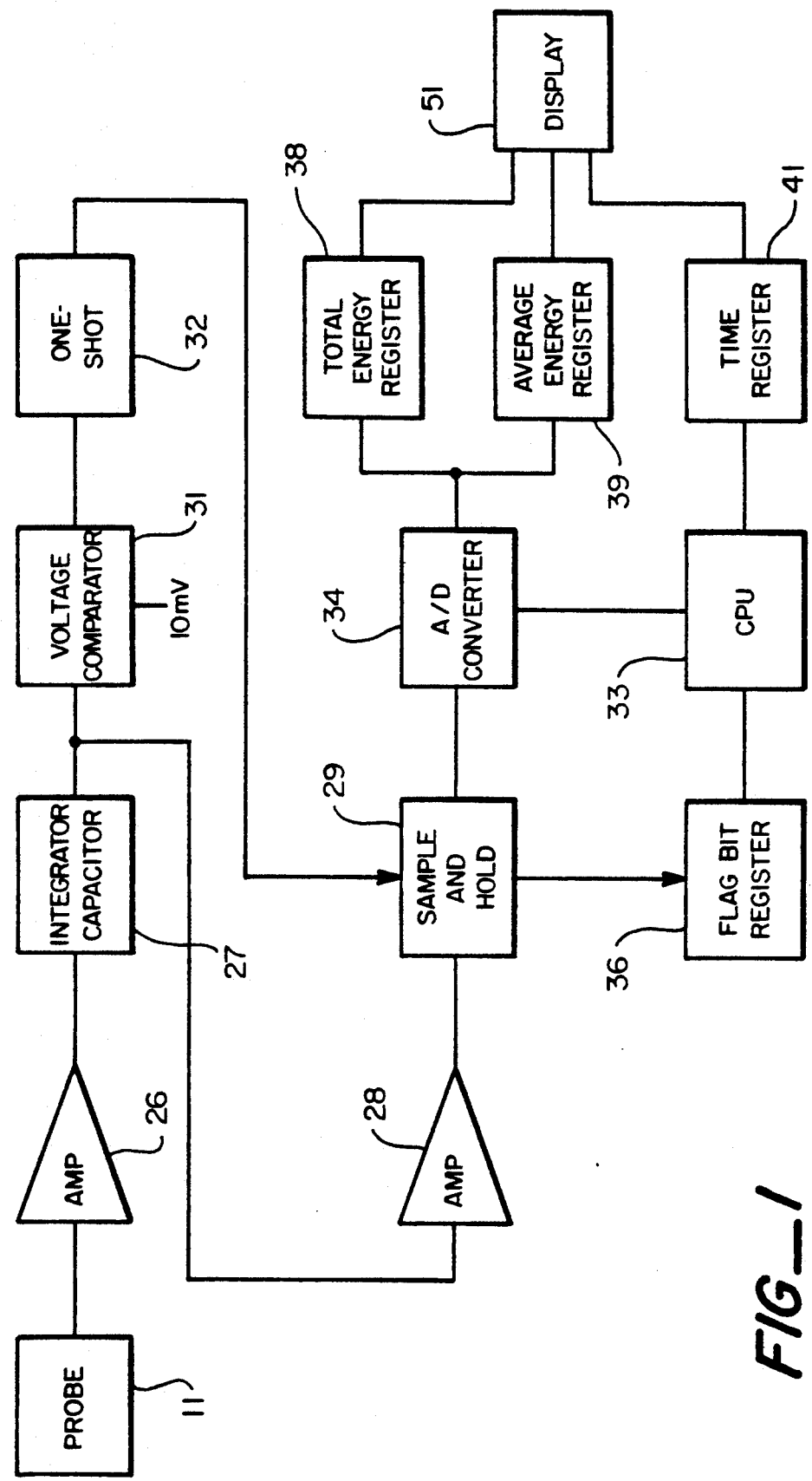
FIG_1

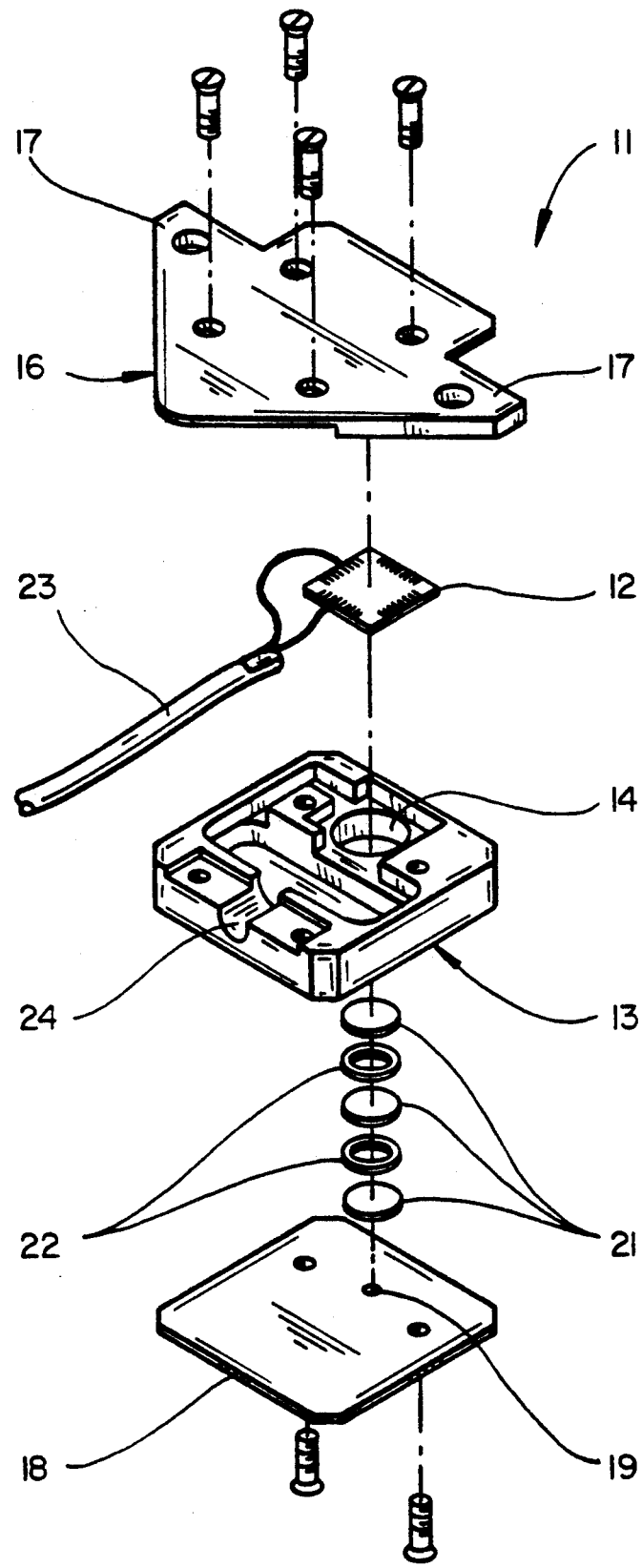
FIG_2

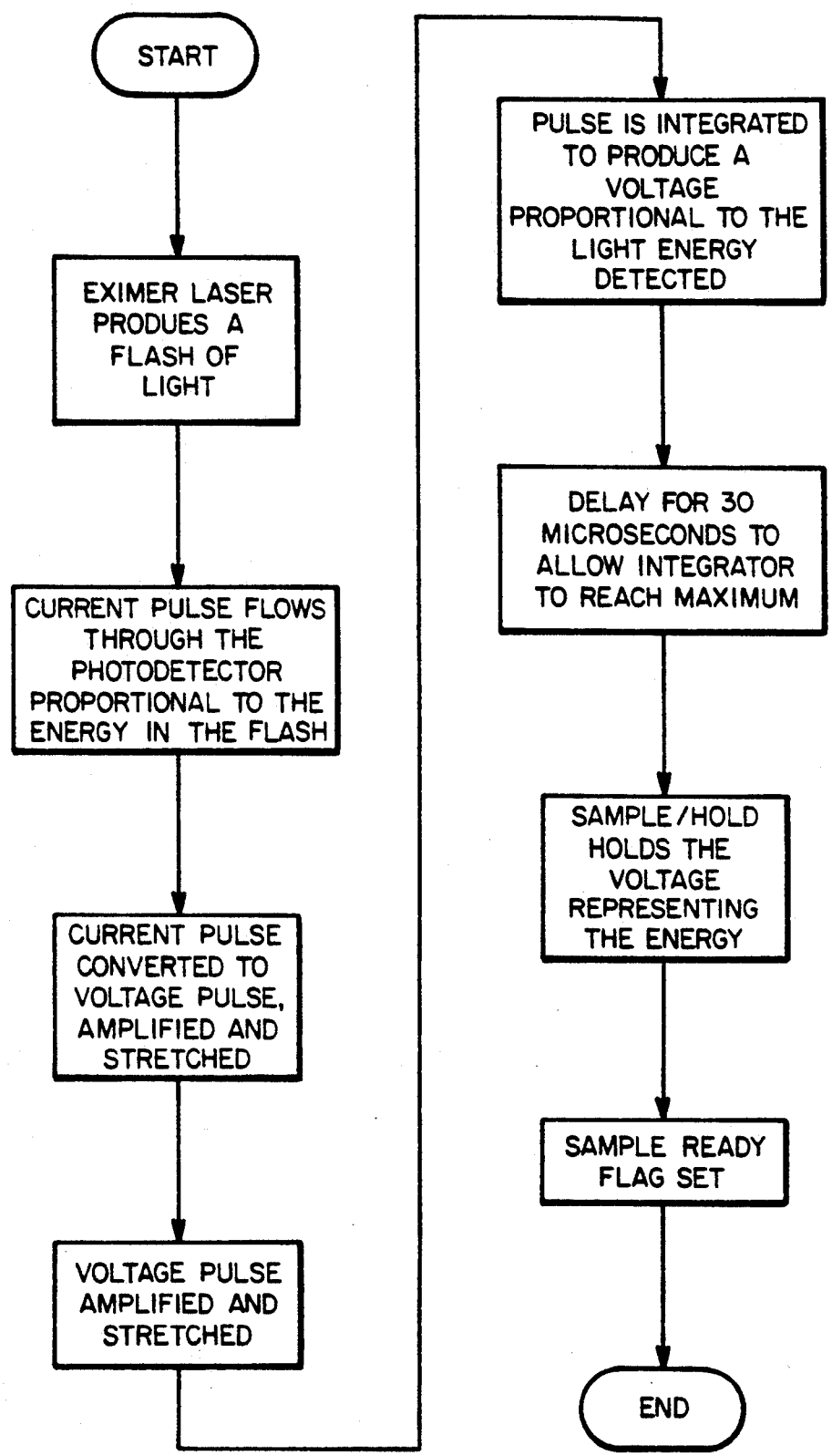
FIG_3

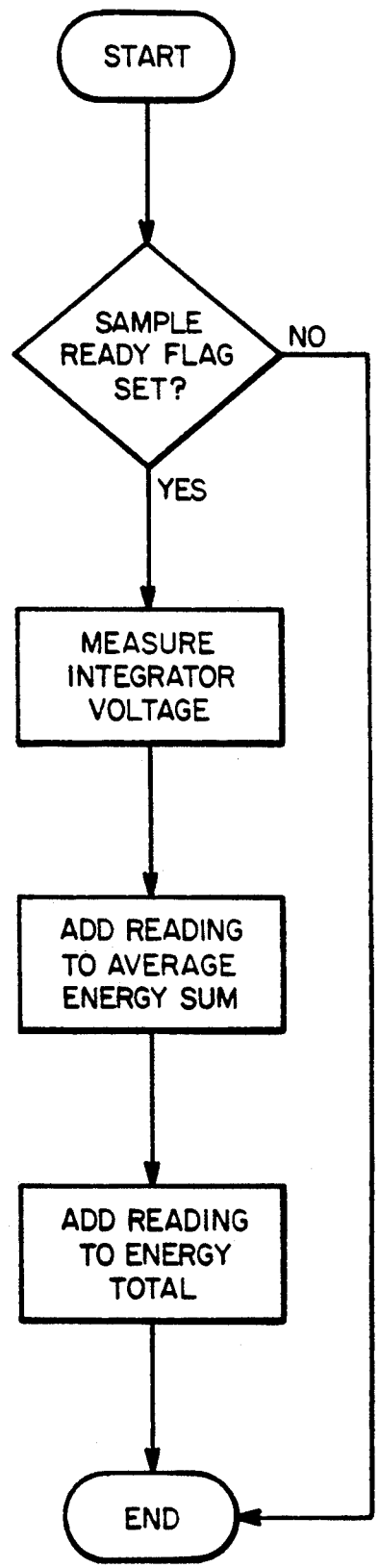
FIG_4

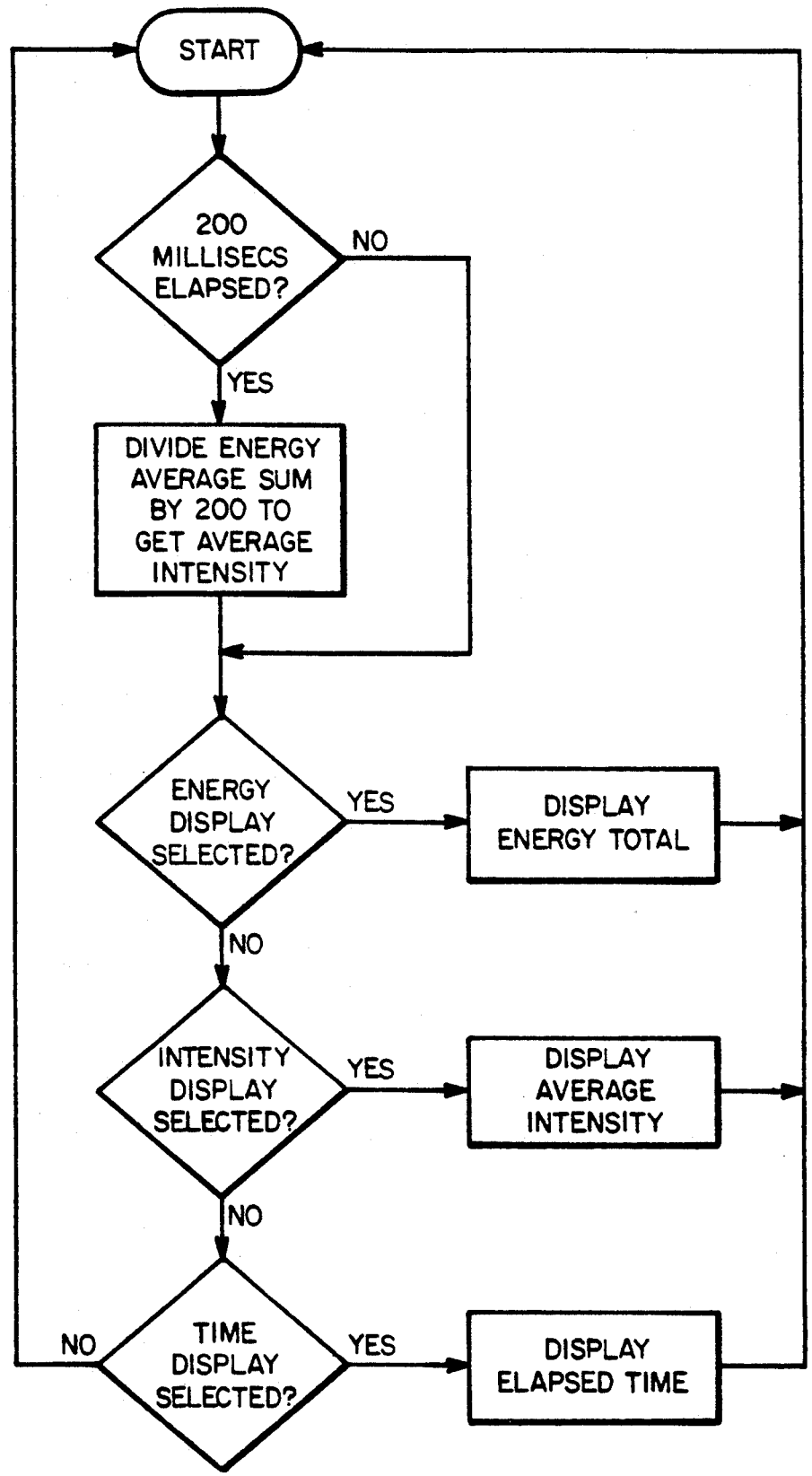
FIG_5

EXCIMER LASER PULSE ANALYZER AND METHOD

This invention pertains generally to laser pulse measurements and, more particularly, to a system and method which are particularly suitable for use in analyzing pulses from an excimer laser.

Excimer lasers are employed in photolithography systems commonly known as "steppers" for patterning photoresist in the manufacture of semiconductor devices. These systems typically include a stage on which a wafer is mounted and a light source which directs a beam onto the wafer to expose the photoresist on the wafer in accordance with the pattern to be formed. These systems are called steppers because they expose a relatively small area of the photoresist at a time, then step to additional areas and expose them. The light source in these systems is an excimer laser, which produces light having a wavelength of 248.3 nanometers.

One characteristic of excimer lasers is the extremely short duration of the light pulses which they produce, typically on the order of 15–18 nanoseconds. The current generation of excimer lasers are capable of flash rates on the order of 1–300 flashes or pulses per second. The intensity of the light at the exposure plane of the wafer in the laser stepper is typically on the order 0.1 to 1.0 millijoule/pulse/cm$^2$. Due to this relatively low level of intensity, it is generally necessary to expose the photoresist on a wafer to many hundreds of pulses equivalent to many seconds of exposure in order to provide enough total energy to the wafer to complete the chemical reaction for the exposure of the photoresist.

Another characteristic of excimer lasers is that the flashes or pulses they produce are not very uniform in intensity. The manufacturers of such lasers nominally specify that the uniformity of light intensity from flash to flash will be within ±10 percent for 90 percent of the flashes. In practice under normal operating conditions, variations in intensity of as much as 50 percent have been observed between successive flashes.

Current laser technology relies for the most part on calorimeters to measure the power of a laser beam. A calorimeter used for this purpose has an absorbing surface upon which the light from the laser is impinged and a thermocouple embedded in the surface for measuring the heat produced on the surface by the light. Since the individual pulses in an excimer laser stepper are highly non-uniform in intensity and have a relatively low intensity, many pulses are required to achieve an accurate power level reading using a calorimeter. Moreover, the power level obtained is an average of a pulse string, and it is not possible to measure individual pulses.

In addition to these limitations, measurement with a calorimeter is slow and highly sensitive to external factors such as room temperature. The calorimeter is also relatively large and unwieldy and not suitable for mounting on the wafer stage of a stepper.

It is in general an object of the invention to provide a new and improved system and method for analyzing pulses from an excimer laser.

Another object of the invention is to provide a system and method of the above character which overcome the limitations and disadvantages of techniques heretofore provided.

Another object of the invention is to provide a system and method of the above character which can be employed with wafer steppers.

These and other objects are achieved in accordance with the invention by monitoring the output of a laser with a photodetector to provide electrical current pulses corresponding to the intensity of the light in individual ones of the laser pulses. The current pulses are integrated to provide voltages corresponding to the light energy of the laser pulses, and the voltages are converted to digital signals. The digital signals are accumulated during the exposure period to determine the total light energy of the pulses during that period and also during a shorter interval of time during the exposure period. The light energy for the interval is divided by the length of the interval to determine the average intensity of the pulses during the interval. Displays are provided for the light energy and the intensity of the pulses, as well as the length of the exposure period.

FIG. 1 is a block diagram of one embodiment of a laser pulse analyzing system according to the invention.

FIG. 2 is an exploded isometric view of a preferred embodiment of a probe for use in the embodiment of FIG. 1.

FIGS. 3–5 are flow charts illustrating the operation of the embodiment of FIG. 1 and the method of the invention.

As illustrated in the drawings, the system includes a probe 11 adapted to be mounted on the wafer stage of a laser stepper (not shown). The probe comprises a detector 12 in the form of a PIN photodiode which is mounted on one side of a generally rectangular block 13 in alignment with a circular bore 14 which extends through the block. A cover plate 16 is mounted on the block over the photodiode, with laterally projecting mounting tabs 17 for attachment to the wafer stage. An aperture plate 18 is removably mounted on the other side of the block, with an aperture opening 19 in axial alignment with the bore and the centerline of the detector for limiting the amount of light impinging upon the detector. By changing the diameter of the aperture opening, the amount of light transmitted to the detector can be increased or decreased. This allows the detector to accommodate various exposure energy ranges while maintaining the detector in a linear response range.

A stack of filter elements 21 is mounted in bore 14, with spacers 22 between the filter elements. The filter stack acts as a narrow band pass filter which permits the transmission of the 248 nanometer wavelength laser light and blocks the transmission of other possible interfering light wavelengths from other sources such as room lighting. In addition, the number and transmission characteristics of the filter elements can also be adjusted to accommodate various exposure energy ranges while maintaining the detector in its linear response range. The filter elements are easily changed when the aperture plate is removed.

Electrical connections between the detector and the rest of the system are made by means of flexible cable 23 which passes out of the probe through an opening 24 in block 13. This cable is grounded to the body of the probe and to the case in which the remainder of the system is enclosed and is shielded against RF interference.

When exposed to a light pulse, the detector produces a current which is proportional to the intensity of the light pulse. With excimer laser pulses at 248 nanometers, the magnitude of the current produced by the detector is on the order of 150 milliamperes per watt of light intensity. Due to the internal impedance and rise time characteristics of the photodiode, the duration of the pulse is stretched so that a 15-18 nanosecond optical pulse produces a current pulse having a duration on the order of 100 nanoseconds.

The output of the photodetector is connected to the input of a high impedance differential operational amplifier 26 which increases the level of the current from the detector. The amplified current is stored in a capacitor 27 connected to the output of the amplifier, which integrates the current to provide a voltage which is proportional to the total energy of the current pulse and, hence, the energy of the light pulse.

The voltage on the capacitor is amplified by an amplifier 28 and sampled by a sample and hold circuit 29 connected to the output of the amplifier. In one presently preferred embodiment, the amplifier has a voltage gain of 25, and the sample and hold circuit stores the amplified voltage for a period of 1.3 milliseconds.

The voltage on the capacitor is monitored continuously by a voltage comparator 31 to detect the occurrence of a pulse. In the embodiment illustrated, the voltage comparator has a threshold level of 10 millivolts to eliminate false triggering. The pulse detector triggers the sample and hold circuit through a one-shot multivibrator 32, which delays the turning on of the sample and hold circuit until amplifier 28 has had an opportunity to rise to its full voltage. In one presently preferred embodiment, the delay provided by the one-shot is on the order of 25-30 microseconds.

The voltage stored in the sample and hold circuit is read out by a CPU 33 which scans that circuit once every millisecond. The output of the sample and hold circuit is connected to the input of an analog-to-digital (A/D) converter 34 which digitizes the voltage read out of the sample and hold circuit. After an A/D conversion has occurred, the CPU resets the delay circuit and closes a switch (not shown) to discharge the capacitor so the system is ready for the next pulse. With a sample and hold period of 1.3 milliseconds, the system can monitor pulses at rates up to about 700 Hz.

A flag bit is stored in a register 36 associated with the CPU to prevent the same voltage from being digitized more than once, as might otherwise happen with a scan interval which is shorter than the sample and hold period. The state of this bit is changed when the sample and hold circuit is turned on and also when a voltage is digitized. The CPU monitors the flag bit, and if the state of this bit has not changed since the last digitization, the voltage stored in the sample and hold circuit is ignored. The digitized data from the A/D converter 34 is accumulated in registers 38, 39 associated with the CPU to provide data corresponding to the total energy in an exposure and an average energy occurring during a shorter interval. Thus, the data for each successive pulse in an exposure is added to register 38, and the data for the most recent 200 milliseconds is accumulated in register 39. The duration of the exposure, as measured by the CPU clock, is stored in a time register 41. By accumulating the data in this manner, the CPU is in effect summing the energy for the entire exposure as well as for the 200 millisecond averaging period.

The end of an exposure is detected by monitoring the flag bit and detecting that no change has occurred for a predetermined period of time, e.g. 20 milliseconds. This period determines the lowest pulse rate the system can monitor, and with a 20 millisecond period, the system can monitor pulse rates as low as 50 Hz.

The total energy for the exposure, the intensity of the pulses, and the length of the exposure are displayed on a display 51 associated with the CPU. The data for the total energy display is obtained directly from register 38, and the data for the time display is obtained from register 41. The intensity of the pulses is determined by dividing the average energy data from register 39 by 200 milliseconds to provide an average intensity in milliwatts. The intensity display is updated every 200 milliseconds, and during an exposure this display will change in accordance with the current average intensity. At the completion of an exposure, regardless of the length of the exposure, the intensity displayed will be the intensity measured during the last 200 milliseconds of the exposure. This value is stored in memory as the intensity of the exposure, along with total energy and the length of the exposure.

Operation and use of the system, and therein the method of the invention, are illustrated in the flow charts of FIGS. 3-5. As illustrated in FIG. 3, when the laser produces a pulse or flash of light, a pulse of current proportional to the intensity of the light in the flash flows through the photodetector. The current pulse is stretched and amplified, then integrated and converted to a voltage proportional to the energy of the light in the flash. After a 25-30 microsecond delay to let the integrator reach its full voltage, the voltage is stored in the sample and hold circuit, and the flag is set to indicate that the sample and hold circuit contains data to be digitized.

Referring now to FIG. 4, the CPU scans the sample and hold circuit at regular intervals and monitors the status of the flag bit. If the flag bit has changed since the last digitization of data in the sample and hold circuit, the CPU reads the voltage from the sample and hold circuit and causes it to be digitized. The digitized data is added to the total energy register 38 and to the average energy register 39. If the status of the flag bit has not changed, the voltage in the sample and hold circuit is ignored.

As illustrated in FIG. 5, the total energy and the length of an exposure are displayed continuously, and the intensity display is updated at 200 millisecond intervals. The data for the energy and time displays is obtained directly from registers 38, 41, and the data for the intensity display is obtained by dividing the data in register 39 by 200 milliseconds.

The invention has a number of important features and advantages. By measuring the light energy, rather than the heat energy, of the laser pulses, it can measure exposure directly at the wafer plane of a laser stepper, resulting in accurate readings of energy, intensity and time. Moreover, it measures the energy of individual pulses and thus permits analysis of resist processes requiring only a single pulse of energy. The data for each exposure is stored, and this data can be processed and displayed as desired to provide information about and comparisons between different exposures.

It is apparent from the foregoing that a new and improved system and method for monitoring laser pulses have been provided. While only certain presently preferred embodiments have been described in detail, as will be apparent to those familiar with the art, certain changes and modifications can be made without departing from the scope of the invention as defined by the following claims.

We claim:

1. In a system for monitoring pulses from a laser during an exposure period in which a plurality of successive pulses are produced: means including a photodetector responsive to light in the laser pulses for providing electrical current pulses corresponding to the intensity of the light in individual ones of the laser pulses, means for integrating the current pulses to provide voltages corresponding to light energy of the laser pulses, means for converting the voltages to digital signals, means for accumulating the digital signals throughout the exposure period to determine total light energy of the pulses during the period, means for accumulating the digital signals for a time interval of predetermined length during the exposure period to determine light energy of the pulses during the interval, and means for dividing the light energy for the interval by the length of the interval to determine the average intensity of the pulses during the interval.

2. The system of claim 1 including an aperture and a filter positioned between the laser and the photodetector to limit the amount and the wavelength of light impinging upon the photodetector.

3. The system of claim 1 wherein the photodetector comprises a PIN photodiode.

4. The system of claim 1 wherein the means for converting the voltages to digital signals comprises a sample and hold circuit adapted to store each of the voltages for a predetermined period of time less than an expected interval between successive pulses from the laser, a flag which changes state when the sample and hold circuit stores a new voltage, means responsive to the state of the flag for periodically scanning the sample and hold circuit and reading the voltage stored therein when the state of the flag indicates that a new voltage has been stored, an analog-to-digital converter, and means for applying the voltage read from the sample and hold circuit to the analog-to-digital converter.

5. In a system for monitoring excimer laser pulses: means including a a PIN photodiode responsive to a pulse of light form an excimer laser for providing an electrical current pulse corresponding to the intensity of the light in the pulse, current amplifying means having a high input impedance connected to the photodiode for increasing the level of the current pulse from the photodiode, means for integrating the current pulse of increased level to provide a voltage corresponding to the light energy of the laser pulse, means for converting the voltage to a digital signal, and means responsive to the digital signal and to the duration of the laser pulse for providing signals corresponding to light energy and intensity of the laser pulse.

6. The system of claim 5 including an aperture and a filter positioned between the laser and the PIN photodiode to limit the amount and the wavelength of light impinging upon the PIN photodiode.

7. In a system for monitoring excimer laser pulses: means including a photodetector responsive to a pulse of light from an excimer laser for providing an electrical current pulse corresponding to the intensity of the light in the pulse, means for integrating the current pulse to provide a voltage corresponding to the light energy of the laser pulse, a sample and hold circuit adapted to store the voltage for a predetermined period of time less than an expected interval between successive pulses from the laser, a flag which changes state when the sample and hold circuit stores a new voltage, means responsive to the state of the flag for periodically scanning the sample and hold circuit and reading the voltage stored therein when the state of the flag indicates that a new voltage has been stored, an analog-to-digital converter, means for applying the voltage read from the sample and hold circuit to the analog-to-digital converter to provide a digital signal corresponding to the light energy of the pulse, and means responsive to the digital signal and to the duration of the laser pulse for providing signals corresponding to the light energy and intensity of the laser pulse.

8. In a method of monitoring pulses from a laser during an exposure period in which a plurality of successive pulses are produced, the steps of: providing electrical current pulses corresponding to the intensity of the light in individual ones of the laser pulses, integrating the current pulses to provide voltages corresponding to light energy of the laser pulses, converting the voltages to digital signals, accumulating the digital signals throughout the exposure period to determine total light energy of the pulses during the period, accumulating the digital signals for a time interval of ascertainable length during the exposure period to determine light energy of the pulses during the interval, and dividing the light energy for the interval by the length of the interval to determine the average intensity of the pulses during the interval.

9. The method of claim 8 wherein the current pulses are provided by impinging the light from the laser pulses upon a PIN photodiode.

10. The method of claim 9 including the step of passing the light from the laser pulses through an aperture and a filter to limit the amount and the wavelength of light impinging on the photodiode.

11. The method of claim 8 wherein the voltages are converted to digital signals by storing each of the voltages in a sample and hold circuit for a predetermined period of time less than an expected interval between successive pulses from the laser, changing the state of a flag when the sample and hold circuit stores a new voltage, periodically scanning the sample and hold circuit and reading the voltage stored therein when the state of the flag indicates that a new voltage has been stored, and applying the voltage read from the sample and hold circuit to an analog-to-digital converter.

12. In a method of monitoring excimer laser pulses, the steps of: impinging light from a laser pulse upon a PIN photodiode to provide an electrical current pulse corresponding to the intensity of the light in the laser pulse, amplifying the current pulse from the photodiode in an amplifier having a high input impedance, integrating the amplified current pulse to provide a voltage corresponding to light energy of the laser pulse, converting the voltage to a digital signal, and processing the digital signal and a signal corresponding to the duration of the laser pulse to providing signals corresponding to light energy and intensity of the laser pulse.

13. The method of claim 12 including the step of passing the light from the laser pulse through an aperture and a filter to limit the amount and the wavelength of light impinging on the photodiode.

14. In a method of monitoring excimer laser pulses, the steps of: providing an electrical current pulse corresponding to the intensity of light in a laser pulse, integrating the current pulse to provide a voltage corresponding to light energy of the laser pulse, storing the voltage in a sample and hold circuit for a predetermined period of time less than an expected interval between successive pulses from the laser, changing the state of a flag when the sample and hold circuit stores a new voltage, periodically scanning the sample and hold circuit and reading the voltage stored therein when the state of the flag indicates that a new voltage has been stored, applying the voltage read from the sample and hold circuit to an analog-to-digital converter, to provide a digital signal corresponding to the light energy of the laser pulse, and processing the digital signal and a signal corresponding to the duration of the laser pulse to providing signals corresponding to the light energy and intensity of the laser pulse.

* * * * *